July 16, 1940.　　　J. W. COX　　　2,207,705

HEARING AID DEVICE

Filed Dec. 21, 1936

INVENTOR
J. W. COX
BY H. S. Grover
ATTORNEY

Patented July 16, 1940

2,207,705

UNITED STATES PATENT OFFICE 2,207,705

HEARING AID DEVICE

John Walter Cox, Berkeley, Calif., assignor to Radio Corporation of America, a corporation of Delaware Application December 21, 1936, Serial No. 116,881

12 Claims. (Cl. 179—107)

This invention relates to a new and improved device to assist hearing.

The primary object of this invention is to provide for those persons whose hearing is impaired, hearing assistance in the form of a novel device having the general appearance of a pair of eye glasses.

A purpose of this invention is to provide alleviation of the sensitiveness of persons who are unfortunate in having their hearing impaired. This is accomplished by combining a miniature microphone with a pair of eye glasses so that hearing is restored without the use of large noticeable apparatus.

Briefly, the convenience of this invention is realized by having the ordinary lens of the eye glasses act as a pickup element or a diaphragm and combining the same with sound amplifying equipment into one unit. The sound reproducing mechanism is attached to or incorporated in the ear gripping portion of the temple of the eye glasses. The battery used in connection with the microphone and sound reproducing mechanism is incorporated in a hollow portion of the frame of the eye glasses.

It has heretofore been the practice in devices to assist the hearing to place the microphone and the battery remote from the ear phones or sound reproducing mechanism, thus requiring connecting wires, with the resultant loss of efficiency due to the distance of the microphone from the speaker. This invention requires little or no connecting wires and maximum efficiency is obtained from the sound pickup system for the reason that the area supplied by the lens of the spectacle and the proximity of the speaker's mouth to the lens gives maximum pickup energy through miniature microphone or microphones.

Another feature of this invention is that it serves the dual purpose of providing spectacles with the proper lenses to correct any impairment of the sight and also assists in the hearing of either one or both ears.

This invention will best be understood by referring to the accompanying drawing, in which.

Figure 1:
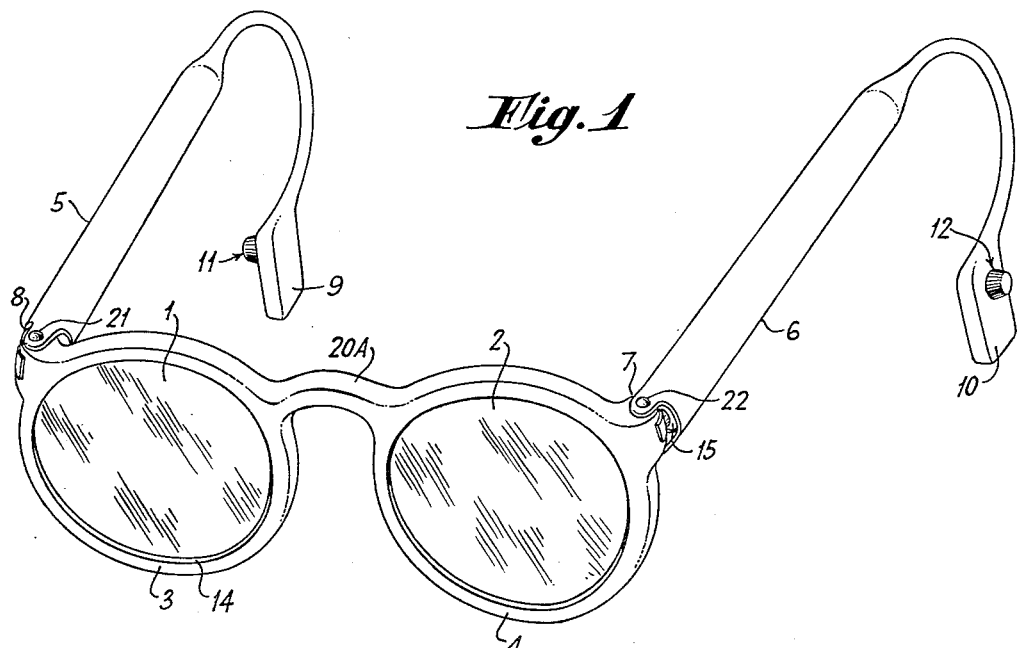
Fig. 1 is a perspective view of the device of this invention.

Referring now in detail to Fig. 1 of the drawing, 1 and 2 represent the lenses of a pair of spectacles; 3 and 4 are miniature carbon microphones; the carbon being located in the rear of the frame portion of the rim; 5 and 6 are the temple portions of the eye glass frame and are hinged at points 7 and 8. Terminating at the ear portion of members 5 and 6 are sound reproducing members 9 and 10 which may be in the form of a sound or bone conduction device or miniature headphone. Attached to members 9 and 10 are combined switch and variable resistance elements 11 and 12 for varying the sound output of devices 9, 10.

Figure 2:
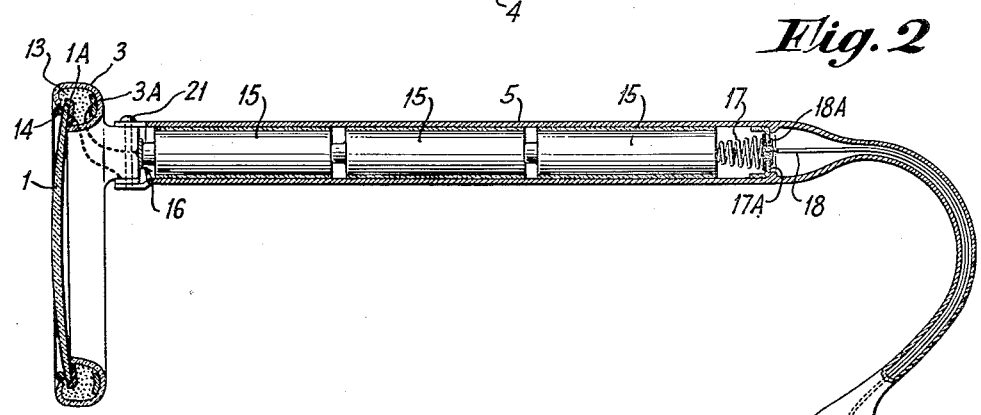
Fig. 2 is a sectional view taken through the center of one of the lenses and also the central portion of the temple portion of the frame member.

A more detailed explanation of this invention will be had by referring to Fig. 2, wherein the lens 1 having metallic rim electrode 1A is mounted within the hollow rim 3 which contains an electrode 3A and carbon granules 13. Lens 1 is securely held in place in member 3 by any suitable means, such as a spring element 14 which is snapped in place after filling the rim portion of member 3 with carbon. Member 5 is hollowed out to receive batteries 15 which are retained in electrical contact with the microphone by contact 16. A spring pressure member 17 keeps battery 15 in electrical contact and is provided with a lead 18 for connecting to sound element 9. Spring member 17 is insulated by member 17A having a metallic eyelet 18A for securing lead 18. A shaft 19 joins the switch and resistance element 11 to start and vary the energy flowing from batteries 15 to sound reproducing element 9. The material for rims 3, 4, also frame members 5, 6, may be of metal or insulating material; if the former is used, suitable insulation must be provided to prevent short-circuiting of the various electrode elements.

Figure 3:
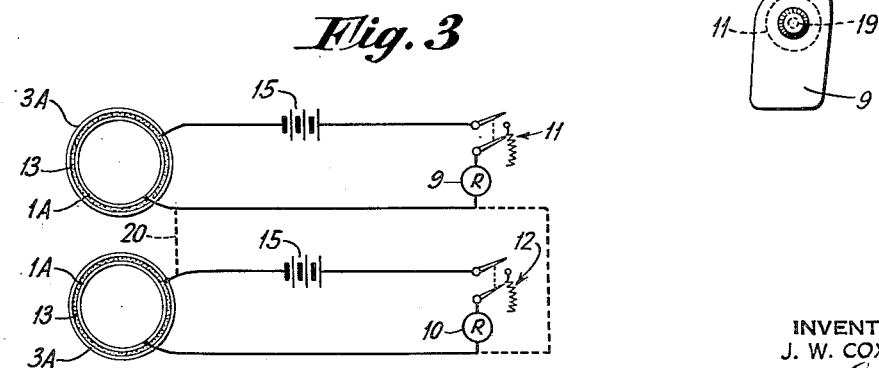
Fig. 3 is a circuit diagram of the device.

Fig. 3 shows a simple circuit arrangement for the device. If desired, a common connection 20 between the two sound reproducing devices can be made, as indicated by broken lines, by way of the bridge or nose portion 20A of the frame. It will be readily apparent that various circuit combinations can be used with the same assembly. For example, the microphone, battery, resistance and sound reproducing device can be made to operate independently of the second set of elements 4, 6, 10 and 12, respectively. Also, the microphones can be connected independently or in parallel, as one method may be superior to the other from a battery supply standpoint. The microphones could be connected in series, and the batteries in parallel, if such an arrangement would be better suited to the battery supply. Furthermore, an external battery can be used in place of the self-contained battery to increase the efficiency of the microphone. The batteries can take the form of either self-contained dry cells or the entire hollow portion of frames 5 and 6 can be arranged to act as a self-contained liquid battery and may be replaced by removing the hinge pins 21 and 22.

The method of operating the specific embodiment shown in Figs. 1, 2 and 3 is as follows: the sound pressure striking lenses 1 and 2 causes the carbon 13 within the miniature microphones 3 and 4 to vary its resistance, thus causing the energy from batteries 15 to vary. The variation of the energy from the batteries is made audible by ear phones or sound reproducing elements 9 and 10.

While only one specific form of this invention is shown, it is to be distinctly understood that it is capable of taking other forms, such as providing the microphones with a double carbon button; also, the microphones may be coupled with suitable stepup transformers.

What is claimed is:

1. A sound amplifying device to assist hearing comprising a pair of spectacles having a hollow rim surrounding the lens of said spectacles, a pair of temples hinged to said hollow rims, a source of current, carbon granules located within the hollow rim portion of said spectacles forming with said lenses a microphone, and a circuit connecting said microphone with said source of current and with a receiving device.

2. A sound amplifying device to assist hearing comprising a pair of spectacles having hollow rims surrounding the lenses of said spectacles, a pair of temples hinged to said hollow rims, a source of current in said temples, an adjustable resistance element connected with said source, carbon granules located within the hollow rim portion of said spectacles forming with said lenses a microphone, and a circuit connecting said microphone in series with said source of current and with a receiving device.

3. A sound amplifying device to assist hearing comprising a pair of spectacles having hollow rims surrounding the lenses of said spectacles, a pair of hollow temples hinged to said hollow rims, a source of current in said temples, means for varying the strength of said source of current, carbon granules located within the hollow rim portion of said spectacles forming with said lenses a microphone, and a circuit connecting said microphone with said source of current and with a receiving device.

4. A sound amplifying device to assist hearing comprising a pair of spectacles having hollow rims surrounding the lenses of said spectacles, metallic rim electrodes on said lenses, a pair of hollow temples hinged to said rims, sources of current, means for varying the strength of said sources of current, carbon granules located within the hollow rim portion of said spectacles forming with said lenses a pair of microphones, and means connecting each of said microphones with one of said sources of current and with a receiving device.

5. A transmitter for hearing aids comprising an eyeglass for picking up sound vibrations, a frame for said glass and means embodied in said frame for varying a current through an electric circuit in response to the vibrations picked up by said glass.

6. A transmitter for hearing aids comprising a pair of eyeglasses, and means responsive to the vibration of a glass of said eyeglasses to vary the resistance in an electrical circuit.

7. A transmitter for hearing aids comprising an eyeglass, a frame for said glass, an electrode element actuated by said glass, a body of granular conducting material in contact with said electrode and a second electrode also in contact with said conducting material.

8. A transmitter for hearing aids including an eyeglass, a pair of electrodes and granular resistance material in contact with said electrodes, said glass being so arranged as to vary the resistance between said electrodes in response to vibration thereof.

9. A transmitter for hearing aids comprising an eyeglass for picking up sound vibrations, a frame for said glass, a pair of electrodes surrounding at least a portion of said glass and granular resistance material between said electrodes.

10. A transmitter for hearing aids comprising an eyeglass, a pair of electrodes surrounding said glass, a frame for mounting said glass and said electrodes, and a granular resistance material between said electrodes and enclosed by said frame.

11. In a sound amplifying device, a transparent member adapted to serve as a spectacle lens and as a microphone diaphragm, a frame wherein said member is retained, an electrical circuit, and means carried by said frame and cooperating with said member and said circuit for varying a current through said circuit in response to movement of said member under the influence of sound waves.

12. In a sound amplifying device, a transparent member, a spectacle frame therefor, an electrical circuit, and means responsive to movement of said member relative to said frame to vary the resistance of said circuit.

JOHN WALTER COX.